United States Patent
Leong et al.

(10) Patent No.: US 9,007,305 B2
(45) Date of Patent: Apr. 14, 2015

(54) OPTICAL NAVIGATION SYSTEM AND METHOD OF ESTIMATING MOTION WITH OPTICAL LIFT DETECTION

(75) Inventors: Yat Kheng Leong, Cheras (MY); Sai Mun Lee, Penang (MY); Thineshwaran G. Krishnan, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 873 days.

(21) Appl. No.: 12/984,556

(22) Filed: Jan. 4, 2011

(65) Prior Publication Data
US 2011/0095984 A1      Apr. 28, 2011

Related U.S. Application Data

(62) Division of application No. 11/602,876, filed on Nov. 20, 2006, now Pat. No. 7,868,281.

(51) Int. Cl.
G06F 3/033     (2013.01)
G06F 3/03      (2006.01)
G06F 3/0354    (2013.01)

(52) U.S. Cl.
CPC .......... G06F 3/0317 (2013.01); G06F 3/03543 (2013.01)

(58) Field of Classification Search
CPC ... G06F 3/0317; G06F 3/03543; G06F 3/038; G06F 3/0304; G06F 3/0383
USPC ................... 345/156–173, 175–158; 257/82; 178/18.09; 382/103; 372/50.21; 463/37
See application file for complete search history.

(56) References Cited

U.S. PATENT DOCUMENTS

| | | | |
|---|---|---|---|
| 4,521,772 A | 6/1985 | Lyon | |
| 4,799,055 A | 1/1989 | Nestler et al. | |
| 4,920,260 A | 4/1990 | Victor et al. | |
| 5,272,685 A * | 12/1993 | Ando | 369/44.14 |
| 6,078,312 A * | 6/2000 | Liebenow | 345/166 |
| 6,256,016 B1 | 7/2001 | Piot | |
| 6,300,612 B1 | 10/2001 | Yu | |
| 6,720,595 B2 | 4/2004 | Clevenger et al. | |
| 6,770,863 B2 | 8/2004 | Walley | |
| 6,940,652 B2 | 9/2005 | Tseng | |
| 6,995,748 B2 | 2/2006 | Gordon et al. | |
| 7,019,733 B2 | 3/2006 | Koay | |
| 7,081,612 B1 | 7/2006 | Lu | |
| 7,142,376 B2 | 11/2006 | Lu | |
| 7,189,985 B2 * | 3/2007 | Xie et al. | 250/559.29 |
| 7,444,005 B2 * | 10/2008 | Bachur et al. | 382/107 |
| 7,460,107 B1 * | 12/2008 | Bohn | 345/166 |
| 7,474,297 B2 * | 1/2009 | Moyer et al. | 345/163 |
| 7,791,591 B2 * | 9/2010 | Collins et al. | 345/166 |
| 7,791,735 B2 * | 9/2010 | Itagaki | 356/498 |

(Continued)

FOREIGN PATENT DOCUMENTS

| | | |
|---|---|---|
| GB | 2429280 | 2/2007 |
| KR | 2003/0048254 | 6/2003 |

*Primary Examiner* — Kevin M Nguyen
*Assistant Examiner* — Mansour M Said

(57) ABSTRACT

An optical navigation system and method of estimating motion uses a plate with an aperture, a photodetector and an optical system for optical lift detection. The optical system is configured to direct an input light to a target surface through the aperture of the plate and to direct the input light reflected from the target surface and transmitted back through the aperture of the plate toward the photodetector to be detected by the photodetector for lift detection.

7 Claims, 4 Drawing Sheets

(56) References Cited

U.S. PATENT DOCUMENTS

| | | |
|---|---|---|
| 7,868,281 B2 * | 1/2011 | Leong et al. ............... 250/208.1 |
| 8,026,900 B2 | 9/2011 | Joung et al. |
| 2003/0112220 A1 | 6/2003 | Yang et al. |
| 2004/0001046 A1 | 1/2004 | Chen |
| 2004/0051798 A1 | 3/2004 | Kakarala et al. |
| 2004/0130532 A1 | 7/2004 | Gordon et al. |
| 2005/0024624 A1 | 2/2005 | Gruhlke et al. |
| 2005/0052411 A1 | 3/2005 | Farag |
| 2005/0057492 A1 | 3/2005 | Bathiche et al. |
| 2005/0190158 A1 | 9/2005 | Casebolt et al. |
| 2005/0231482 A1 | 10/2005 | Theytaz et al. |
| 2006/0028447 A1 | 2/2006 | Vook |
| 2006/0071907 A1 | 4/2006 | Joung et al. |
| 2006/0091298 A1 | 5/2006 | Xie et al. |
| 2006/0119580 A1 | 6/2006 | Chie |
| 2006/0119581 A1 | 6/2006 | Levy |
| 2006/0131487 A1 | 6/2006 | Mathis |
| 2006/0176581 A1 | 8/2006 | Lu |
| 2006/0279545 A1 | 12/2006 | Lan et al. |
| 2007/0008286 A1 | 1/2007 | Theytaz et al. |
| 2007/0013661 A1 * | 1/2007 | Theytaz et al. ............... 345/166 |
| 2007/0181785 A1 | 8/2007 | Helbing et al. |
| 2008/0158158 A1 * | 7/2008 | Cheah et al. ............... 345/166 |
| 2008/0231600 A1 | 9/2008 | Smith |

* cited by examiner

OPTICAL NAVIGATION SYSTEM AND METHOD OF ESTIMATING MOTION WITH OPTICAL LIFT DETECTION

CROSS-REFERENCE TO RELATED APPLICATIONS

This is a divisional of copending application Ser. No. 11/602,876, filed on Nov. 20, 2006, the entire disclosure of which is incorporated into this application by reference.

BACKGROUND OF THE INVENTION

Optical navigation systems operate to estimate movements between the optical navigation systems and target surfaces to perform tracking operations. An optical navigation system uses a light source, such as a light-emitting diode (LED) or a laser diode, and an image sensor to successively capture frames of image data of a target surface. The optical navigation system compares the successive image frames and estimates the relative movements between the optical navigation system and the target surface based on the comparison between the current image frame and a previous image frame. The comparison is based on detecting and computing displacements of features in the captured frames of image data. For laser-based navigation systems, these features are usually interference images produced by a laser spot impinging on the target surface.

Optical navigation systems are commonly used in optical computer mice to track the movements of the mice relative to the surfaces on which the mice are manually manipulated. In order to perform the tracking operation properly, an optical mouse needs to be on the target surface since errors are introduced when the distance between the image sensor of the optical navigation system and the target surface is significantly increased, i.e., when the optical mouse has been lifted from the target surface. In an optical mouse with a laser-based navigation system, the optical interference images used for motion estimation grow as the distance between the image sensor of the system and the target surface is increased. Consequently, the navigation system can still be responsive after the optical mouse has been lifted from the target surface, which means erroneous motion estimates will be made by the navigation system.

The optical characteristics of the interference images do not allow a meaningful solution to the issue of lift detection using the image sensor of the optical navigation system. Thus, a separate sensing mechanism such as a mechanical switch is needed to detect when the optical mouse is lifted from a target surface.

Although conventional lift detection mechanisms work well for their intended purpose, there is a need for a non-complex and low cost lift detection mechanism for use in optical navigation systems.

SUMMARY OF THE INVENTION

An optical navigation system and method of estimating motion uses a plate with an aperture, a photodetector and an optical system for optical lift detection. The optical system is configured to direct an input light to a target surface through the aperture of the plate and to direct the input light reflected from the target surface and transmitted back through the aperture of the plate toward the photodetector to be detected by the photodetector. The input light detected at the photodetector indicates that the optical navigation system has not been lifted from the target surface. Conversely, no light (except for negligible light) detected at the photodetector indicates that the optical navigation system has been lifted from the target surface.

An optical navigation system in accordance with an embodiment of the invention comprises a light source, an image sensor and a lift detection unit. The light source is configured to generate light. The image sensor is positioned to receive a first portion of the light reflected from a target surface. The image sensor is configured to generate frames of image data in response to the received first portion of the light for motion estimation. The lift detection unit comprises a plate with an aperture, a photodetector and an optical system. The photodetector is positioned over the plate. The optical system is positioned over the plate to receive a second portion of the light from the light source. The optical system is configured to direct the second portion of the light through the aperture of the plate. The optical system is further configured to direct the second portion of the light reflected from the target surface and transmitted back through the aperture of the plate toward the photodetector to be detected by the photodetector.

An optical navigation system in accordance with an embodiment of the invention comprises a plate with an aperture, a photodetector and an optical system. The photodetector and the optical system are positioned over the plate. The optical system comprises first, second and third prisms. The first prism is positioned to receive an input light. The first prism is configured and orientated to refract the input light through the aperture of the plate. The second prism is positioned to receive the input light reflected from a target surface and transmitted back through the aperture of the plate. The second prism is configured and orientated to refract the input light to a predefined direction. The third prism is positioned to receive the input light from the second prism. The third prism is configured to refract the input light toward the photodetector to be detected by the photodetector.

A method of estimating motion in accordance with an embodiment of the invention comprising generating light, directing a first portion of the light toward a target surface, receiving the first portion of the light reflected from the target surface at an image sensor for motion estimation, directing a second portion of the light toward the target surface through an aperture positioned over the target surface, directing the second portion of the light reflected from the target surface and transmitted back through the aperture toward a photodetector, and receiving the second portion of the light at the photodetector.

Other aspects and advantages of the present invention will become apparent from the following detailed description, taken in conjunction with the accompanying drawings, illustrated by way of example of the principles of the invention.

DETAILED DESCRIPTION

Figure 1:
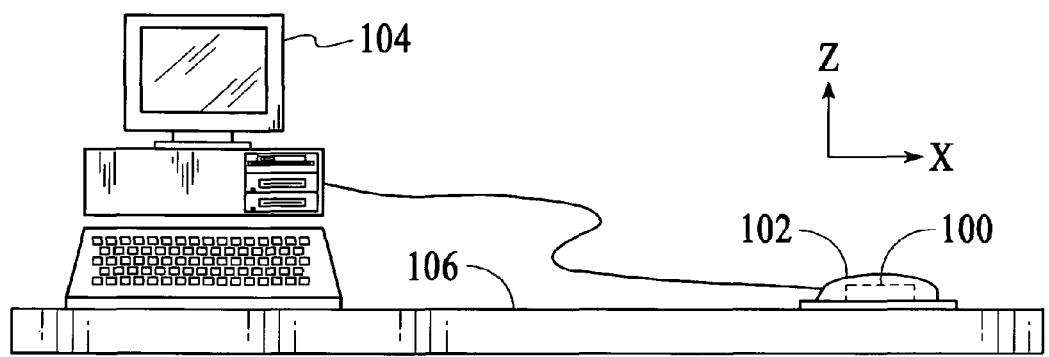
FIG. 1 shows an optical navigation system included in an optical computer mouse in accordance with an embodiment of the invention.

With reference to FIG. 1, an optical navigation system 100 in accordance with an embodiment of the invention is described. As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a target surface 106, which may be a glass surface or other optically transparent surface, by a user to control a cursor displayed on the computer 104. However, in other implementations, the optical navigation system 100 can be used in different products for various tracking applications. As described in detail below, the optical navigation system 100 includes an optical lift detection feature to optically detect when the optical mouse 102 has been lifted from the surface in the Z direction. The optical lift detection feature of the optical navigation system 100 can be implemented using low cost components without the requirement of critical alignment.

Figure 2:
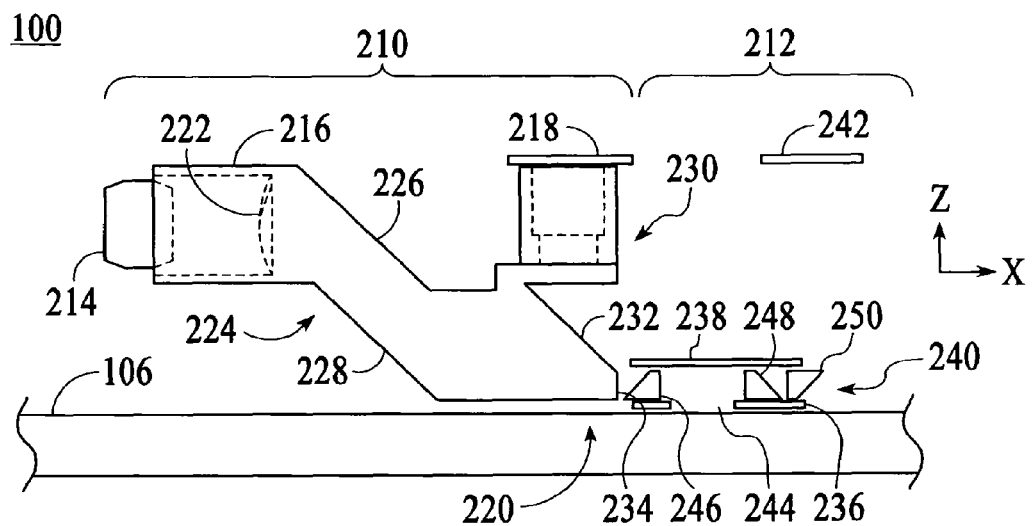
FIG. 2 is a diagram of the optical navigation system in accordance with an embodiment of the invention.

Turning now to FIG. 2, various components of the optical navigation system 100 are shown. FIG. 2 is a sectional view of the optical navigation system 100. As shown in FIG. 2, the optical navigation system 100 includes a navigation unit 210 and a lift detection unit 212. The primary function of the navigation unit 210 is to capture frames of image data for motion estimation. The primary function of the lift detection unit 212 is to detect when the optical mouse 102 with the optical navigation system 100 has been lifted from the target surface 106.

The navigation unit 212 includes a light source 214, an optical guide structure 216 and an image sensor 218. The light source 214 generates light, which will be used for both motion estimation and lift detection. In this embodiment, the light source 214 is a laser device, such as a vertical-cavity surface-emitting laser (VCSEL), which generates coherent light. However, in other embodiments, the light source 214 may be a light emitting diode or any other light emitting device. The light source 214 is positioned to emit light along the X direction into the optical guide structure 216.

The optical guide structure 216 is an optically transparent structure configured to direct some of the light received from the light source 214 to an imaging area 220 of the target surface 106. The optical guide structure 216 is also designed to receive the light reflected off the imaging area 220 of the target surface 106 to transmit the reflected light to the image sensor 218. Furthermore, the optical guide structure 216 is designed to transmit some of the light received from the light source 214 to the lift detection unit 212, which uses this light to detect when the optical mouse 102, or any other device, with the optical navigation system 100 has been lifted from the target surface 106. In particular, the optical guide structure 216 is designed to transmit some of the light from the light source 214 to the lift detection unit 212 such that the light is mostly traveling along the X direction.

The optical guide structure 216 may be structurally shaped in any number of configurations, as long as the optical guide structure can optically perform the above-described tasks. In the illustrated embodiment, the optical guide structure 216 includes an input port 222 to receive the light emitted from the light source 214 so that the received light is transmitted into the optical guide structure along the X direction. The input port 222 of the optical guide structure 216 has a convex surface to focus the received light from the light source 214. The optical guide structure 216 also includes an intermediate section 224, which internally reflects the light from the input port 222 so that the light is maintained along the X direction but closer to the bottom of the optical guide structure 216, i.e., closer to the target surface 106 on which the optical computer mouse 102 is being operated. The intermediate section 224 of the optical guide structure 216 includes an upper surface 226, which reflects the light from the input port 222 downward along the Z direction, and a lower surface 228, which reflects the light from the upper surface 226 back along the X direction. The optical guide structure 216 also includes an output section 230, which separates the light from the lower surface 228 so that some of the light can be used for motion estimation and some of the light can be used for lift detection. The output section 230 includes a reflective surface 232, which reflects a portion of the light from the lower surface 228 downward along the Z direction toward the imaging area 220 of the target surface 106 for use in motion estimation. The output section 230 also includes an output port 234 to output a portion of the light from the lower surface 228 along the X direction toward the lift detection unit 212 for use in lift detection.

The image sensor 218 is positioned above the optical guide structure 216 to receive the light reflected off the imaging area 220 of the target surface 106 to capture frames of image data of the target surface. Specifically, the image sensor 218 is positioned over the reflective surface 232 of the optical guide structure 216 to receive the light reflected from the imaging area 220 of the target surface 106. The image sensor 218 includes an array of photosensitive pixel elements (not shown), which generate image signals in response to light incident on the elements. As an example, the image sensor 218 may be a charged-coupled device (CCD) image sensor or a complementary metal oxide semiconductor (CMOS) image sensor. The number of photosensitive pixel elements included in the image sensor 218 may vary depending on at least performance requirements of the optical navigation system 100 with respect to optical motion estimation. As an example, the image sensor 218 may include a 30×30 array of active photosensitive pixel elements.

Figure 3:
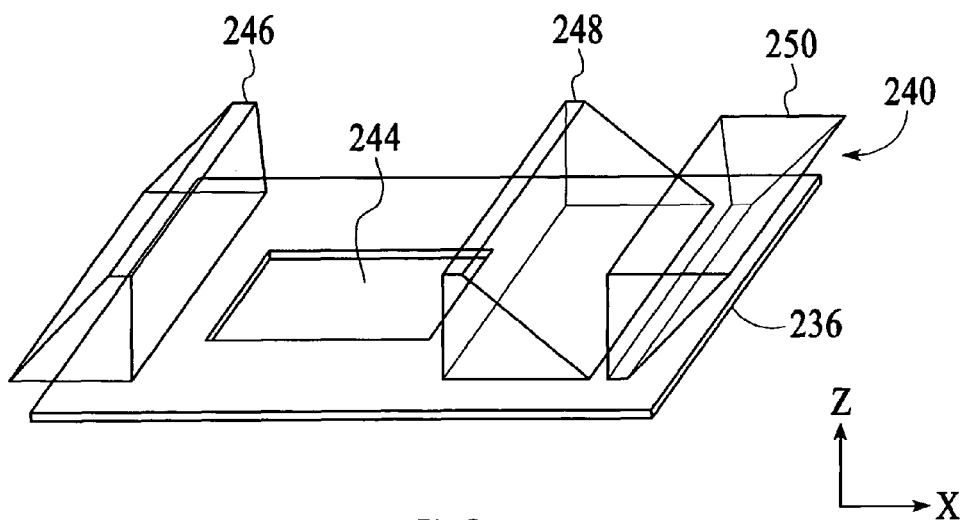
FIG. 3 is a perspective view of a lower plate and an optical system of the optical navigation system in accordance with an embodiment of the invention.

The lift detection unit 212 of the optical navigation system 100 includes a lower plate 236, an upper plate 238, an optical system 240 and a photodetector 242. The upper plate 238 is positioned over the lower plate 236 such that there is a predefined distance between the plates. The lower and upper plates 236 and 238 are positioned next to the output port 234 of the optical guide structure 216. Both the lower and upper plates 236 and 238 are orientated to be parallel along the X direction. As best shown in FIG. 3, which is a perspective view of the lower plate 236 and the optical system 240, the lower plate includes an aperture 244. In the illustrated embodiment, the aperture 244 of the lower plate 236 is rectangular in shape. However, in other embodiments, the aperture 244 of the lower plate 236 may have a different shape, such as a circular shape. The lower and upper plates 236 and 238 are optically opaque such that light is block by the plates. Thus, only way for light to pass through the lower plate 236 is through the aperture 244 of the lower plate. The lower and upper plates 236 and 238 of the lift detection unit 212 may be attached to the housing (not shown) of the optical computer mouse 102.

The optical system 240 is positioned between the lower and upper plates 236 and 238 to receive the light emitted from the output port 234 of the optical guide structure 216. The optical system 240 is configured to direct the received light downward through the aperture 244 of the lower plate 236 at an angle greater than zero with respect to the X axis, which is parallel to the lower plate 236. The light transmitted through the aperture 244 of the lower plate 236 is then reflected off the target surface 106. The optical system 240 is further configured to receive the light reflected off the target surface and transmitted back through the aperture 244 of the lower plate 236, and to direct that light to the photodetector 242, which in the illustrated embodiment is located above the upper plate 238 but not directly over the upper plate. The upper plate 238 is used to prevent any unwanted light from reaching the photodetector 242.

The optical system 242 includes three prisms 246, 248 and 250, which are positioned between the lower and upper plates 236 and 238. In the illustrated embodiment, the prisms 246, 248 and 250 are triangular prisms with three major sides. Specifically, in the illustrated embodiment, the prisms 246, 248 and 250 are right triangular prisms. Thus, the cross-section of the prisms 246, 248 and 250 is right triangular in shape. In the illustrated embodiment, the non-right angled corners of the prisms 246, 248 and 250 are angled at forty-five degrees (45%). However, in other embodiments, these non-right angled corners of the prisms 246, 248 and 250 may be angled at different degrees. Furthermore, in other embodiments, the prisms 246, 248 and 250 may not be right triangular prisms, and may even not be triangular prisms.

The first prism 246 is positioned between the optical guide structure 216 and the aperture 244 of the lower plate 236. The first prism 246 is orientated such that its right angled corner is at the bottom near the lower plate 236 and the hypotenuse side of the prism 246 is facing the output port 234 of the optical guide structure 216 to receive light emitted from the output port. Thus, the first prism 246 refracts the light emitted from the output port 234 of the optical guide structure 216 downward at an angle toward the aperture 244 of the lower plate 236.

The second prism 248 is positioned such that the aperture 244 of the lower plate 236 is located between the first prism 246 and the second prism 248. The second prism 248 is orientated such that its right angled corner is at the bottom near the lower plate 236 and the hypotenuse side of the prism 248 is facing away from the output port 234 of the optical guide structure 216. The second prism 248 is positioned to receive the light from the first prism, which has been reflected off the target surface 106 and transmitted back through the aperture 244 of the lower plate 236. The second prism 248 refracts the received light so that the refracted light propagates along the X direction toward the third prism 250.

The third prism 250 is positioned such that the second prism 248 is located between the aperture 244 of the lower plate 236 and the third prism 250. The third prism 250 is orientated such that its right angled corner is at the top near the upper plate 238 and the hypotenuse side of the prism 250 is facing away from the output port 234 of the optical guide structure 216. In addition, the third prism 250 is located such that most of the hypotenuse side of the prism 250 extends out from under the upper plate 238. The third prism 250 is positioned to receive the refracted light from the second prism 248. The third prism 250 refracts the received light upward so that the refracted light propagates along the Z direction toward the photodetector 242.

The photodetector 242 is positioned over the third prism 250 to receive the light refracted from the third prism 250. The photodetector 242 may be any type of a light sensing device, such as a photodiode or other light intensity sensor. The photodetector 242 is configured to generate an electrical signal in response to incident light. As explained below, when the optical computer mouse 102 has not been lifted beyond a predefined height from the target surface 106, the photodetector 242 will receive light from the optical system 240. However, when the optical computer mouse 102 has been lifted beyond the predefined height from the target surface 106, the photodetector 242 will not receive any light from the optical system 240. Thus, the electrical signal generated by the photodetector 242 in response to incident light can be used to detect when the optical computer mouse 102 has been "lifted" from the target surface 106. In addition, for a more robust system, a preset threshold for optical power received by the photodetector 242 is defined, which will eliminate any error signal generated by stray light. The predefined height that defines when the optical computer mouse 106 has been "lifted" from the target surface 106 can be adjusted by varying the distances between the prisms 246, 248 and 250 of the lift detection unit 212.

Figure 4:
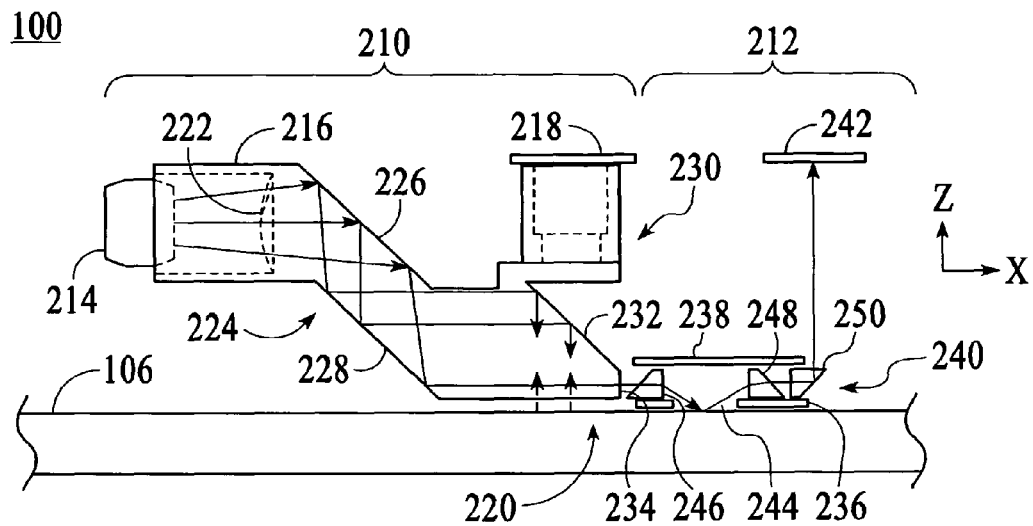
FIG. 4 is a diagram of the optical navigation system of FIG. 2, showing optical paths of light through the optical navigation system when the optical computer mouse has not been lifted.

The operation of the optical navigation system 100 in accordance with an embodiment of the invention is described with reference to FIGS. 4 and 5. FIG. 4 shows optical paths of light through the optical navigation system 100 when the optical computer mouse 102 has not been lifted beyond the predefined height from the target surface 106. The light emitted from the light source 214 is transmitted along the X direction into the optical guide structure 216 at the input port 222. The light is then internally reflected off the upper surface 226 of the optical guide structure 216 downward along the Z direction. The light is then again internally reflected off the lower surface 228 of the optical structure 216 so that the reflected light propagates again along the X direction. The light is then divided into first and second portions of light. The first portion of light is reflected off the reflective surface 232 of the optical guide structure 216 downward toward the imaging area 220 of the target surface 106. This light is then reflected from the target surface 106 and received by the image sensor 218 to produce frames of image data for motion estimation. However, the second portion of light is transmitted through output port 234 of the optical guide structure 216 toward the lift detection unit 212.

The light emitted from the output port 234 of the optical guide structure 216 is then refracted by the first prism 246 of the optical system 240 of the lift detection unit 212 downward through the aperture 244 of the lower plate 236 to the target surface 106. The light is then reflected upward from the target surface 106. Due to the close proximity of the target surface 106 to the lower plate 236, the reflected light is transmitted back through the aperture 244 toward the second prism 248 of the lift detection unit 212. The light is then refracted by the second prism 248 toward the third prism 250 of the lift detection unit 212 along the X direction. At the third prism 250, the light is refracted upward along the Z direction toward the photodetector 242. The light is then detected by the photodetector 242, which indicates that the computer optical mouse 102 has not been "lifted" from the target surface 106.

Figure 5:
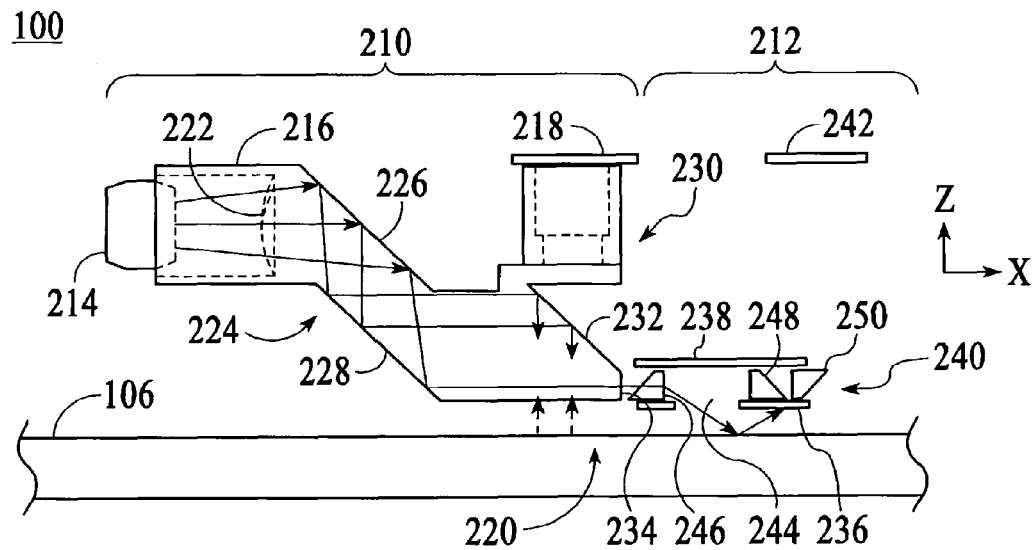
FIG. 5 is a diagram of the optical navigation system of FIG. 2, showing optical paths of light through the optical navigation system when the optical computer mouse has been lifted.

FIG. 5 shows optical paths of light through the optical navigation system 100 when the optical computer mouse 102 has been lifted beyond the predefined height from the target surface 106. The light emitted from the light source 214 travels through the optical guide structure 216 in the same manner as described above. Thus, a first portion of light is reflected off the target surface 106 and received at the image sensor 218 for motion estimation. Furthermore, a second portion of light is emitted from the output port 234 of the optical guide structure 216. The light emitted from the output port 234 is again refracted by the first prism 246 of the lift detection unit 212 downward through the aperture 244 of the lower plate 236 to the target surface 106. The light is then reflected upward from the target surface 106. However, now the distance between the target surface 106 and the lower plate 236 has been increased since the optical computer mouse 102 has been lifted beyond the predefined height. Thus, the reflected light from the target surface 106 is not transmitted back through the aperture 244 of the lower plate 236. Rather, the reflected light from the target surface 106 is blocked by the lower plate 236. Thus, the reflected light from the target surface 106 does not reach the photodetector 242. Consequently, no light (except maybe negligible light) is detected by the photodetector 242, which indicates that the computer optical mouse 102 has been "lifted" from the target surface 106.

The lift detection technique of the optical navigation system 106 is independent of the materials and characteristics of the target surface 106 since it only needs to detect the intensity of light reaching the photodetector 242. The lift detection sensitivity of the optical navigation system 100 is dependent on the size of the aperture 244 of the lower plate 236 of the lift detection unit 212. Thus, the optical navigation system 100 can be adjusted to be more sensitive by using a smaller aperture in the lower plate 236 of the lift detection unit 212.

Figure 6:
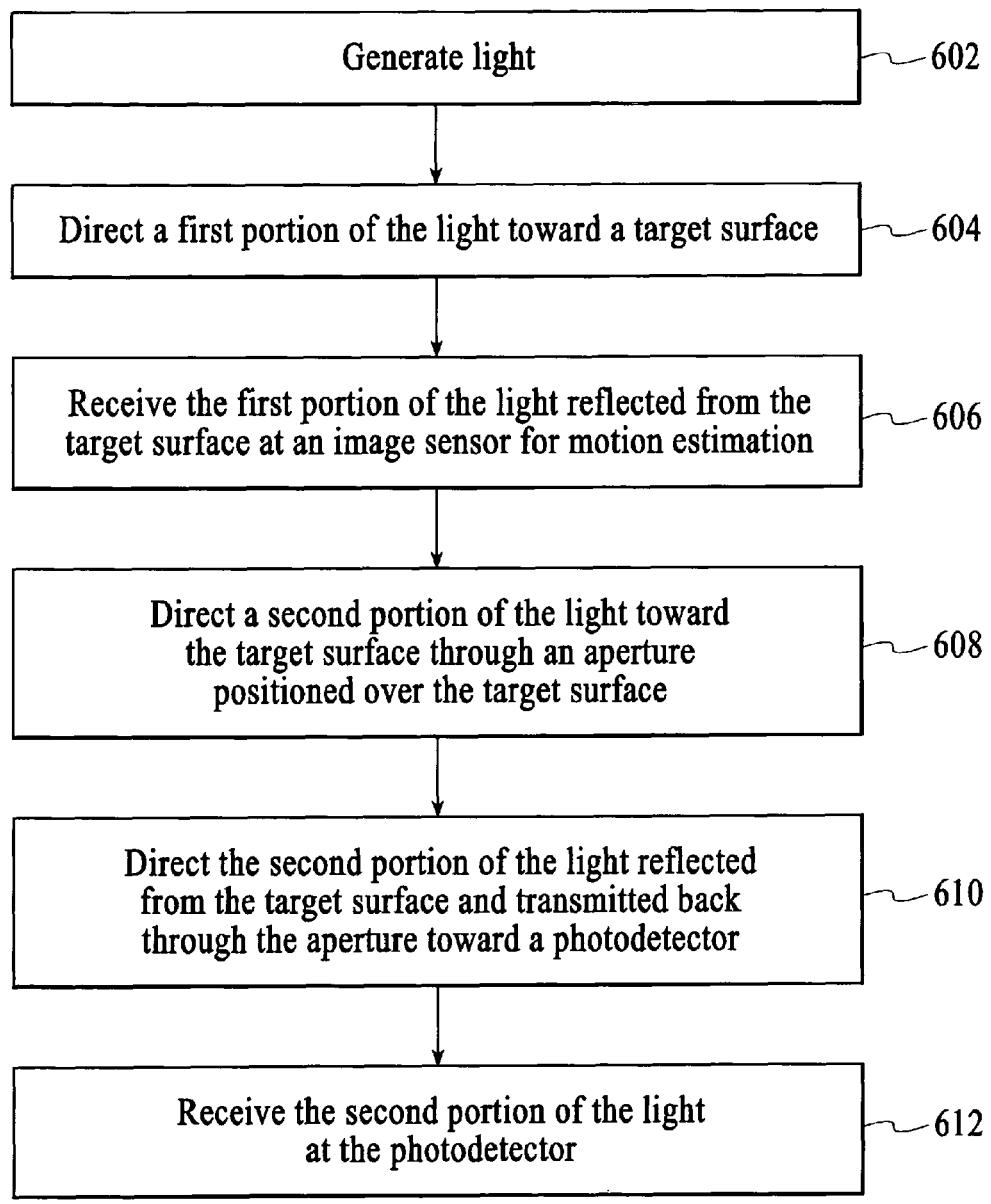
FIG. 6 is a process flow diagram of a method of estimating motion in accordance with an embodiment of the invention.

A method of estimating motion in accordance with an embodiment of the invention is described with reference to a process flow diagram of FIG. 6. At block 602, light is generated. At block 604, a first portion of the light is directed toward a target surface. At block 606, the first portion of the light reflected from the target surface is received at an image sensor for motion estimation. At block 608, a second portion of the light is directed toward the target surface through an aperture positioned over the target surface. At block 610, the second portion of the light reflected from the target surface and transmitted back through the aperture is directed toward a photodetector. At block 612, the second portion of the light is received at the photodetector for lift detection.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation system comprising:
   a light source configured to generate light;
   an optical guide structure, said optical guide structure being configured to separate said light into said first and second portions of said light, said optical guide structure further being configured to direct said first portion of said light toward a first region of a target surface;
   an image sensor positioned to receive said first portion of said light reflected from said first region of said target surface, said image sensor being configured to generate frames of image data in response to said received first portion of said light for motion estimation; and
   a lift detection unit comprising:
      a plate with an aperture;
      a photodetector positioned over said plate; and
      an optical system positioned over said plate to receive said second portion of said light from said optical guide structure, said optical system being configured to direct said second portion of said light toward a second region of said target surface through said aperture of said plate, said first and second regions being different regions of said target surface, said optical system being further configured to direct said second portion of said light reflected from said second region of said target surface and transmitted back through said aperture of said plate toward said photodetector to be detected by said photodetector for lift detection.

2. The system of claim 1 wherein said light source includes a light-emitting diode or a laser device.

3. An optical navigation system comprising:
   a light source configured to generate light;
   an optical guide structure, said optical guide structure being configured to separate said light into first and second portions of said light, said optical guide structure further being configured to direct said first portion of said light toward a first region of a target surface;
   an image sensor positioned to receive said first portion of said light reflected from said first region of said target surface, said image sensor being configured to generate frames of image data in response to said received first portion of said light for motion estimation; and
   a lift detection unit comprising:
      a plate with an aperture;
      a photodetector positioned over said plate; and
      an optical system positioned over said plate to receive said second portion of said light from said optical guide structure, said optical system being configured to direct said second portion of said light toward a second region of said target surface through said aperture of said plate, said first and second regions being different regions of said target surface, said optical system being further configured to direct said second portion of said light reflected from said second region of said target surface and transmitted back through said aperture of said plate toward said photodetector to be detected by said photodetector for lift detection,
   wherein said optical system comprises:
      a first prism positioned to receive said second portion of said light, said first prism being configured and orientated to refract said second portion of said light toward said aperture of said plate;
      a second prism positioned to receive said second portion of said light reflected from said target surface and transmitted back through said aperture of said plate, said second prism being configured and orientated to refract said second portion of said light along a predefined direction; and
      a third prism positioned to receive said second portion of said light from said second prism, said third prism being configured to refract said second portion of said light toward said photodetector.

4. The system of claim 3 wherein at least one of said first, second and third prisms is a triangular prism.

5. The system of claim 4 wherein at least one of said first, second and third prisms is a right triangular prism.

6. The system of claim 3 wherein said first and second prisms are positioned over said plate such that said aperture of said plate is located between said first and second prisms.

7. The system of claim 6 wherein said third prism is positioned over said plate such that said second prism is located between said aperture of said plate and said third prism.

* * * * *